Figure 1:
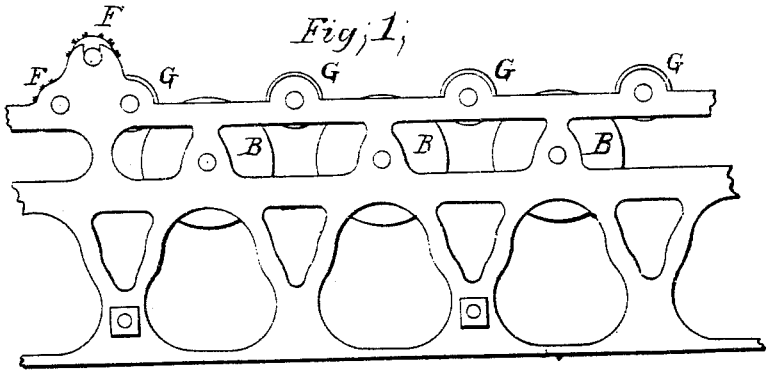
Figure 2:
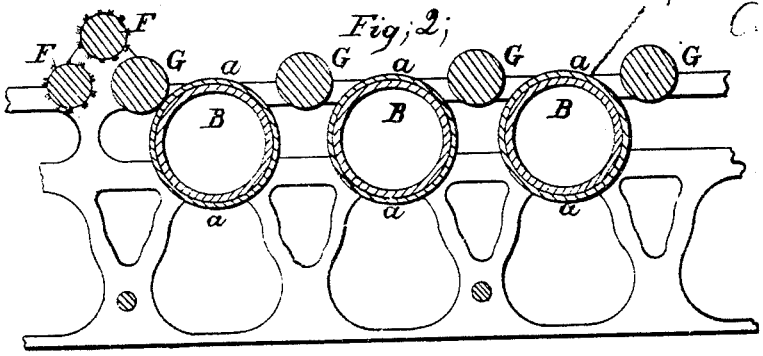
Figure 1:
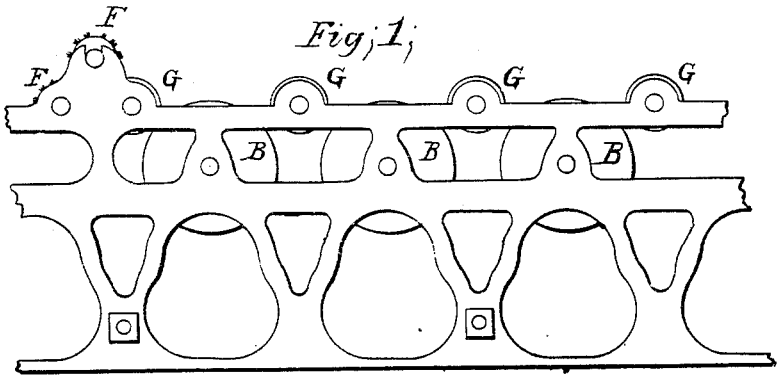
Figure 2:
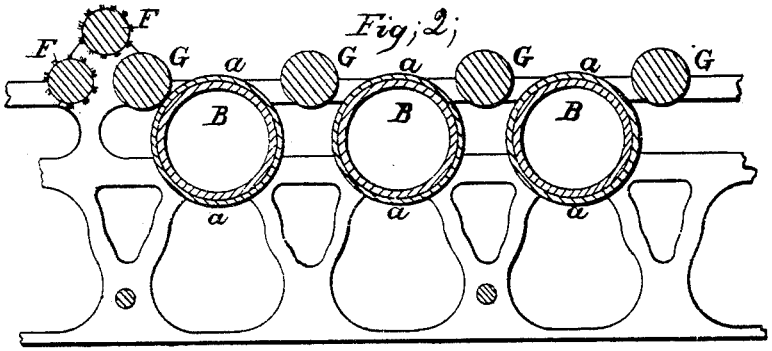

34. DRYING & GAS OR VAPOR CONTACT WITH SOLIDS.

110

NO PRINTED SPECIFICATION AVAILABLE.

BEST AVAILABLE COPY

W. Bradley

Dressing and Sizing Warps.

A. I. No. 213. A. I. Patented Dec. 9, 1858.

Witnesses;

A. B. Stoughton

E. Cohen

Inventor;

Wm. Bradley

NO PRINTED SPECIFICATIONS AVAILABLE

BEST AVAILABLE COPY

W. Bradley

Dressing and Sizing Warps.

No. 213. A. I. Patented Dec. 9, 1858.

Witnesses;
A. B. Stoughton
E. Cohen

Inventor;
Wm. Bradley

N. PETERS, PHOTO-LITHOGRAPHER, WASHINGTON, D. C.